Jan. 2, 1923.

W. M. REASON.
AUTOMOBILE SIGNAL.
FILED FEB. 10, 1922.

1,440,629

INVENTOR.
Walter M. Reason.
BY
ATTORNEY.

Patented Jan. 2, 1923.

1,440,629

UNITED STATES PATENT OFFICE.

WALTER M. REASON, OF PONTIAC, MICHIGAN.

AUTOMOBILE SIGNAL.

Application filed February 10, 1922. Serial No. 535,444.

*To all whom it may concern:*

Be it known that I, WALTER M. REASON, a citizen of the United States, residing at Pontiac, county of Oakland, State of Michigan, have invented a certain new and useful Improvement in Automobile Signals, and declare the following to be a full, clear, and exact description of the same, such as will enable others skilled in the art to which it pertains to make and use the same, reference being had to the accompanying drawings, which form a part of this specification.

This invention relates to automobile stop signals and the object of the invention is to provide a stop signal for the rear of an automobile which is operated by a single electric light. Another object of the invention is to provide an automobile stop signal formed integral with an automobile tail lamp the device being also arranged for use as a parking light. A further object of the invention is to provide a red tail lamp which is illuminated by the electric lamp, the casing for the tail lamp having an upper portion provided with a green light and a stop light, a vertically movable mirror being provided within the casing which is adapted to be operated by a foot brake to reflect light from the incandescent bulb through the green or stop lights. A further object of the invention is to provide a stop light comprising a movable mirror mounted in such a manner that the mirror shuts off the light from the portion of the casing thereabove. A still further object of the invention is to provide a combination tail light, license light, stop light and parking light including a vertically movable mirror which is adapted to be moved upwardly to expose and illuminate the different signals, the mirror in its uppermost position exposing and illuminating all the signals, the device being arranged to be held in such position when the vehicle is parked. These objects and the several novel features of the invention are hereinafter more fully described and claimed and the preferred form of construction by which these objects are attained is shown in the accompanying drawings in which—

Figures 1, 2:
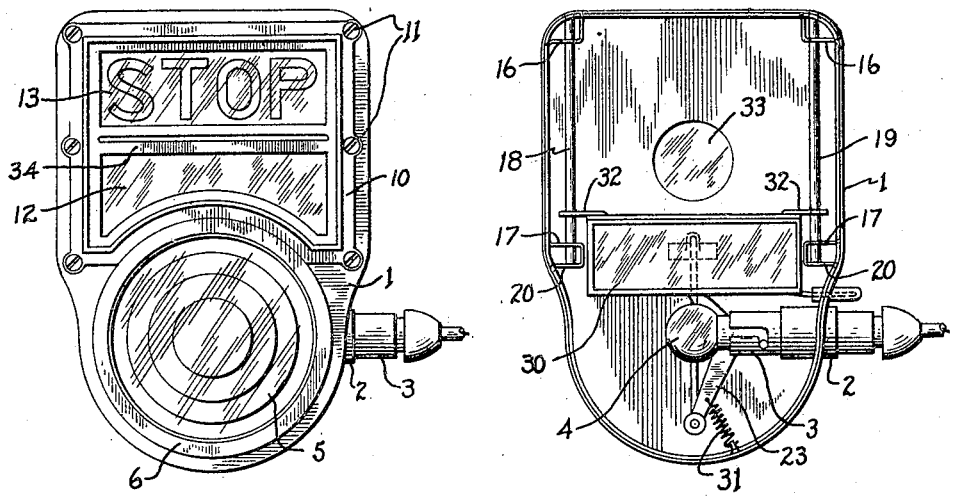
Fig. 1 is a face view of an automobile stop light embodying my invention.
Fig. 2 is a section therethrough showing the mirror in the lowermost position.
Figures 3, 4:
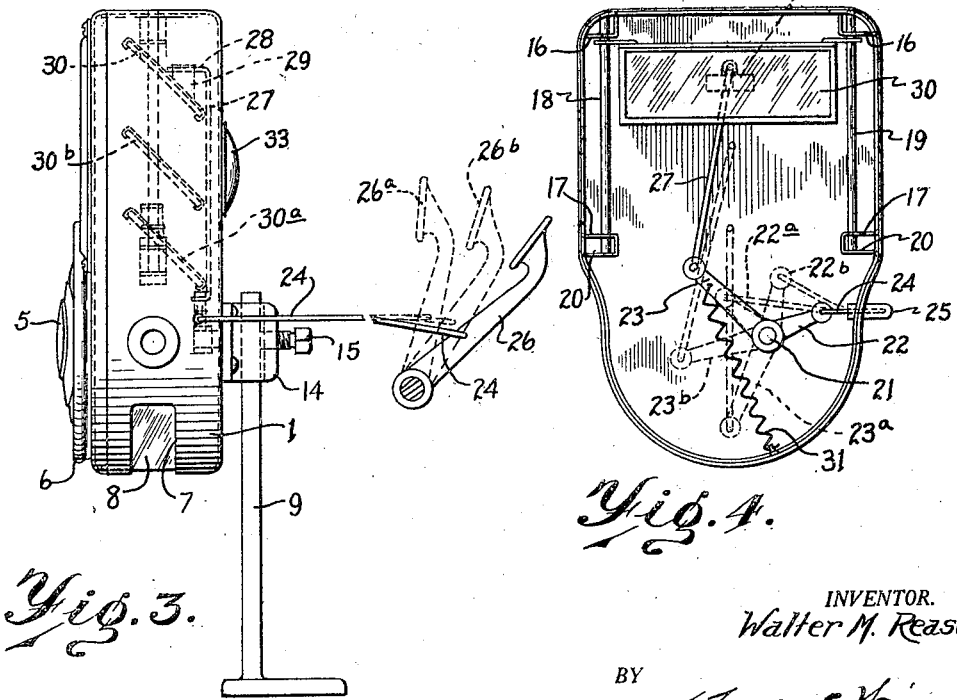
Fig. 3 is a side elevation of the device.
Fig. 4 is a section similar to Fig. 2 showing the means for moving the mirror vertically.

As shown in Fig. 1 a casing 1 is provided having a sleeve 2 welded in one side thereof as shown in Fig. 2 in which an electric lamp socket 3 is mounted which is provided with an incandescent electric bulb 4 positioned centrally behind the red lens 5 shown in Fig. 1. The lens 5 is mounted in a member 6 shown in Figs. 1 and 3 which is secured in the casing. The casing 1 as shown in Fig. 3 is provided with an arcuate slot 7 directly beneath the incandescent bulb 4 and the slot 7 is closed by an arcuate transparent member 8 either of celluloid or glass through which a license plate on the bracket 9 may be illuminated. On the upper part of the casing a member 10 is secured by the screws 11 as shown in Fig. 1 and this member 10 carries a green glass 12 and a red glass 13 directly above having the word "Stop" embossed thereon. The casing 1 is provided with a bracket 14 as shown in Fig. 3 which is adapted to fit over the license bracket 9 of an automobile and is secured thereto by a set screw 15. A pair of brackets 16 and 17 are mounted on the interior of the casing on each side and are apertured to receive the guide rods 18 and 19 as shown in Figs. 2 and 4 and the lower end of each rod rests on the portion 20 of the bracket 17 which is not apertured. A bell crank is pivoted on a pivot 21 within the lower portion of the casing and is provided with a short arm 22 and a longer arm 23 as will be seen more readily in Fig. 4. A cable or cord 24 is connected to the short arm of the bell crank and passes through a small sleeve or tube 25 and is connected at the opposite end to the brake pedal 26 as shown in Fig. 3. The long arm 23 of the bell crank is provided with a rod or pitman 27 pivotally mounted in the end thereof and this rod 27 as shown in dotted lines in Fig. 3 extends upwardly and is provided with a bent end 28 which is pivotally mounted in a bracket 29 provided on the back of an angularly positioned mirror 30. This mirror 30 is provided with a lug 32 at each end which is apertured to receive the guide rods 18 and 19. By this arrangement as the mirror is provided with guides on each side to receive the guide rods and with the angular bracket 29 to receive the bent rod end 28 the mirror is always held at the same angle within the casing when moved vertically in either direction. I have shown in Fig. 3 three different positions of the brake pedal 26 and in Fig. 4 the corresponding three positions of the bell crank. The first position indicated by the dotted lines 26ª is the position of the brake pedal during normal operation of the vehicle when the brake is not applied. The corresponding position of the bell crank is indicated by the dotted lines 22ª and 23ª in Fig. 4 or in the position shown in full lines in Fig. 2. In this position the mirror is in its lowermost position, as shown in Fig. 2, or as shown by dotted lines 30ª in Fig. 3. As will be seen from Fig. 3 the incandescent bulb 4 will illuminate the red lens 5 and the license plate through the glass 8 but the mirror in the position 30ª shuts off the light from the upper portion of the casing so that the glasses 12 and 13 and the parking light 33 are not illuminated. In this position any light reflected by the mirror merely aids in the illumination of the lens 5. In the second position, indicated by dotted lines 26ᵇ, the brake is partially applied which moves the bell crank to the position indicated by dotted lines 22ᵇ and 23ᵇ in Fig. 4 thus raising the mirror by means of the rod 27 to the position 30ᵇ on the guide rods 18 and 19. In this position the incandescent bulb will illuminate the red lens 5, the glass 8 and due to the angular position of the mirror the light from the incandescent bulb will be reflected through the green glass 12 directly above the lens 5. In this position 30ᵇ the upper edge of the mirror is directly behind the rib 34 shown in Fig. 1 between the green light and the stop light so that the portion of the casing above the green light remains dark and light is shut off from the parking light 33. When the brake is fully applied as shown by full lines 26 in Fig. 3 the bell crank is in the position shown by full lines 22 and 23 in Fig. 4. At this time the mirror 30 is in its uppermost position and the light from the incandescent bulb will not only illuminate the lens 5 and glass 8 but will be reflected by means of the mirror through the green glass 12 and the stop glass 13 and will also shine through the transparent parking light 33. It will thus be seen that at any position of the mirror the red lens 5 and the glass 8 are illuminated and by applying the brake the mirror will be moved correspondingly to reflect the light through the different signals. The cable or cord 24 may be also provided with a portion spliced thereto which may be connected to the emergency brake lever. In this case when the vehicle is parked the emergency brake is set by means of the lever thus raising the mirror 30 to the highest position within the casing and, as the bracket 9 is usually placed on the rear left fender a white light will show through the lens 33 from the forward end of the vehicle, and the lens 5, glass 12 and stop signal 13 will be illuminated and readily seen from the rear of the vehicle thus providing a parking light. A coiled spring 31 shown in Figs. 2 and 4 is connected to the bottom of the casing and to the arm 23 of the bell crank and returns the bell crank to the position shown in full lines in Fig. 2 upon release of the brake pedal thus also moving the mirror 30 to the position shown in full lines in Fig. 2. A switch may be applied to the brake pedal for daylight driving whereby actuation of the brake pedal lights the electric light to illuminate the proper signal and upon release of the brake pedal the light will go out. This arrangement results in a saving of electricity and is desirable for driving in the daylight when a tail lamp is not needed but for evening driving the tail lamp 4 is always lighted to show a red light through the lens 5.

From the foregoing description it becomes evident that the device is very simple and efficient in operation, is of comparatively low manufacturing cost, will not easily get out of order, is very positive in action and provides a device which accomplishes the objects described.

Having thus fully described my invention, its utility and mode of operation, what I claim and desire to secure by Letters Patent of the United States is—

1. An automobile signal comprising a casing, having a series of signal lenses in alignment therein, an electric light behind one lens, an angularly positioned mirror slidably movable behind the remaining lenses, and means for moving the mirror to reflect the light through any lens.

2. In an automobile stop signal, a casing, a lens mounted in the casing, an incandescent electric light behind the lens within the casing, a series of signals mounted in the casing, a mirror slidably mounted within the casing and adapted to reflect the light through the different signals, and means for sliding the mirror.

3. In an automobile signal, a casing, a red lens, a green lens, and a stop lens mounted in vertical alignment therein, an electric light behind the red lens within the casing, an angularly positioned mirror adapted to be moved vertically of the casing to reflect the electric light through the different lenses, and means for raising or lowering the mirror.

4. An automobile signal comprising a casing having a series of signal lenses in alignment therein, an incandescent electric bulb adapted to illuminate one of the series of lenses, a pair of guide rods within the casing, an angularly positioned mirror slidably movable on the guide rods, a bell crank pivotally mounted in the casing, a pitman connecting the bell crank and mirror, and means for operating the bell crank to move the mirror to position to reflect light from the incandescent bulb through any of the series of lenses.

5. In an automobile signal comprising a casing having a series of signal lenses mounted therein, an incandescent electric bulb adapted to illuminate one of the series of lenses, a guide rod mounted in each side of the casing, an angularly positioned mirror slidably mounted on the guide rods, a bell crank pivotally mounted in the casing, a pitman connecting the bell crank and mirror, and means connecting the bell crank with the brake pedal of an automobile whereby operation of the brake pedal moves the mirror to reflect light through the different lenses.

6. In an automobile signal, a casing having a plurality of apertures through which light may be projected, a lamp projecting light through one of the apertures, and a reflector movable to cause projection of light from another aperture without affecting the projection of light through the first named aperture.

In testimony whereof, I sign this specification.

WALTER M. REASON.